United States Patent [19]

Seibel et al.

[11] 3,912,199
[45] Oct. 14, 1975

[54] APPARATUS FOR EXTENDING AND RETRACTING A DRIVE SHAFT

[75] Inventors: Charles M. Seibel, Arlington; Joseph A. Canavespe, Fort Worth, both of Tex.

[73] Assignee: Textron, Inc., Providence, R.I.

[22] Filed: Apr. 22, 1974

[21] Appl. No.: 462,889

[52] U.S. Cl. ............................. 244/17.11; 416/142
[51] Int. Cl.$^2$ .................... B64C 27/32; B64C 27/52
[58] Field of Search .......... 416/142, 143; 74/89.15, 74/424.8; 244/17.11, 17.25, 6, 7 R, 7 A, 17.27

[56] References Cited
UNITED STATES PATENTS

| | | | |
|---|---|---|---|
| 1,491,512 | 4/1924 | Bracco | 416/142 |
| 2,330,803 | 10/1943 | Andrews | 416/142 X |
| 2,481,502 | 9/1949 | Downing | 416/142 X |
| 3,428,271 | 2/1969 | Hollrock et al. | 416/142 X |
| 3,824,905 | 7/1974 | Jablonsky | 74/89.15 X |

FOREIGN PATENTS OR APPLICATIONS

| | | | |
|---|---|---|---|
| 1,091,401 | 11/1967 | United Kingdom | 416/142 |

Primary Examiner—Duane A. Reger
Attorney, Agent, or Firm—Richards, Harris & Medlock

[57] ABSTRACT

Retraction of the main rotor mast of a helicopter from an operating position and extension to such a position is accomplished by apparatus including a mast adapter shaft in the main transmission of the helicopter's power drive. Vertical displacement of the main rotor mast is accomplished by the mast adapter shaft rotating against a helical spline formed as an integral part of the mast. With the mast itself restrained from rotating by a connection between the helicopter air frame and the rotor hub, the mast adapter shaft is rotated and the rotor mast extends or retracts by interaction of the helical spline on the mast interacting with a mating helical spline of the mast adapter. A split-ring or clamp is attached to the rotor mast at a point on the helical spline to be in contact with the mast adapter thereby preventing unintentional retraction of the mast. A solid shoulder at the bottom of the mast drives against a neck in the mast adapter shaft as an upstop. To retract the main rotor mast, the split-ring or clamp is removed and assembled into a clamp groove at the top of the mast. The mast adapter shaft is then rotated to crank the mast down with the split-ring or clamp acting as a retraction limit stop.

14 Claims, 10 Drawing Figures

APPARATUS FOR EXTENDING AND RETRACTING A DRIVE SHAFT

This invention relates to apparatus for extending and retracting a drive shaft, and more particularly to a vertically displaceable main rotor mast for a rotary wing aircraft.

Conventionally, the length of the main rotor mast of a rotary wing aircraft, that is, a helicopter, is determined by center of gravity travel requirements and fuselage clearance requirements of the main rotor blades. Due to the length of the main rotor blades, and the semi-rigid construction thereof, the blades tend to assume an arc due to gravity as the centrifugal forces diminish as rotation of the main rotor is slowed. Therefore, for normal operation, the main rotor mast is quite long. For nonflight functions such as storage, concealment or air transportability, this long mast presents significant problems, and it is desirable to retract or shorten the mast to reduce the overall height of the aircraft.

Heretofore, mechanisms for shortening the height of a main rotor above the fuselage added considerable weight to the vehicle and required special tools or highly torqued fasteners to accomplish the intended purpose. Further, previous retraction mechanisms were complicated arrangements of mechanical parts that required a significant number of man hours to complete the retraction procedure.

Although the invention will be described with emphasis on its application to the vertical displacement of the main rotor mast of a helicopter, it should be understood that it is not so limited and may be adapted for extending a drive shaft for other applications.

In accordance with the present invention, apparatus for extending a drive shaft temporarily anchored against rotation includes an externally threaded or splined section extending along the length of the shaft and forming an integral part thereof. An internally threaded sleeve encircles the drive shaft and engages the externally threaded or splined section. This threaded or splined sleeve is an integral part of the main power train through which a drive mechanism may impart rotation thereto to extend and retract the drive shaft through the rotating sleeve.

In accordance with a specific embodiment of the invention, the drive shaft comprises the main rotor mast of a helicopter with the externally threaded section consisting of a helical spline engaging the internally threaded sleeve, also formed as a helical spline.

A more complete understanding of the invention and its advantages will be apparent from the specification and claims and from the accompanying drawings illustrative of the invention. Referring to the drawings:

Figure 6:
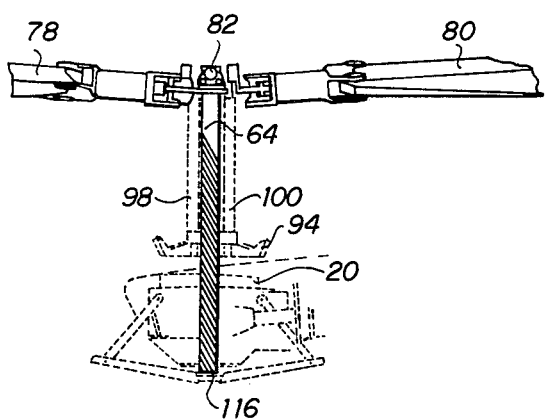
Figure 7:
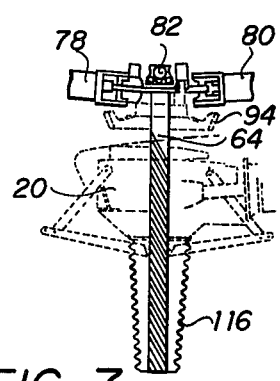
Figure 8C:
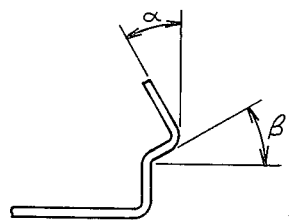
Figure 8A:
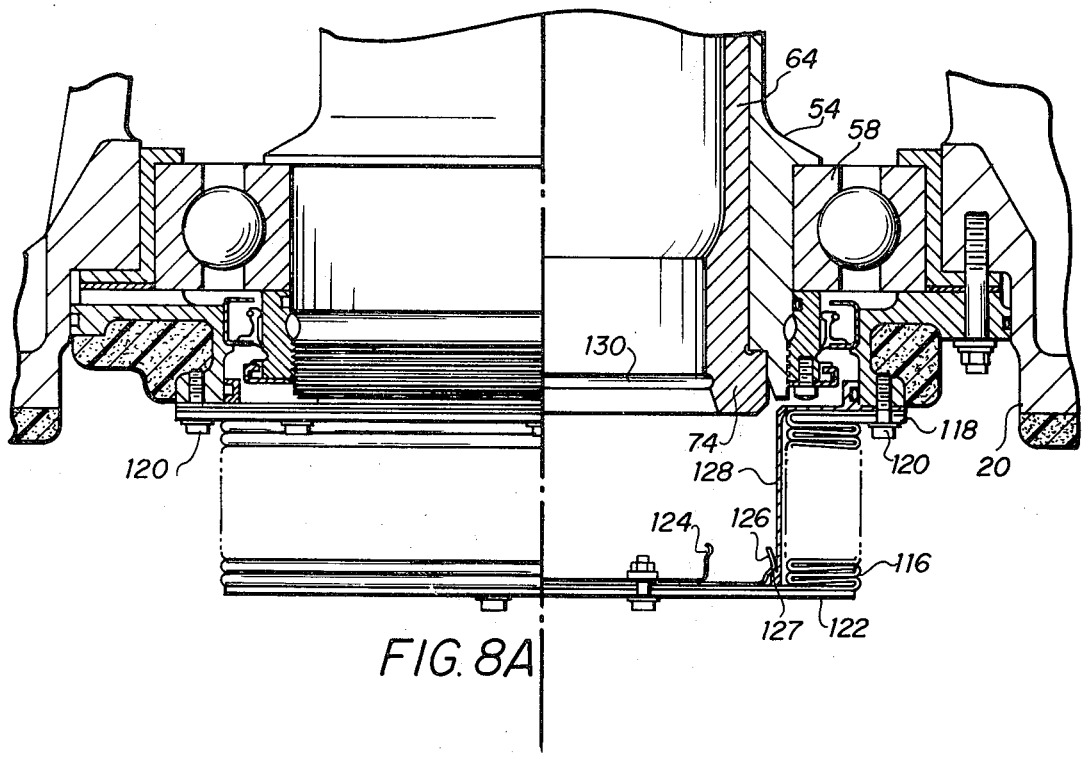
Figure 8B:
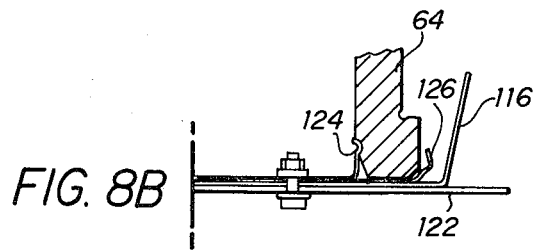
Figure 4:
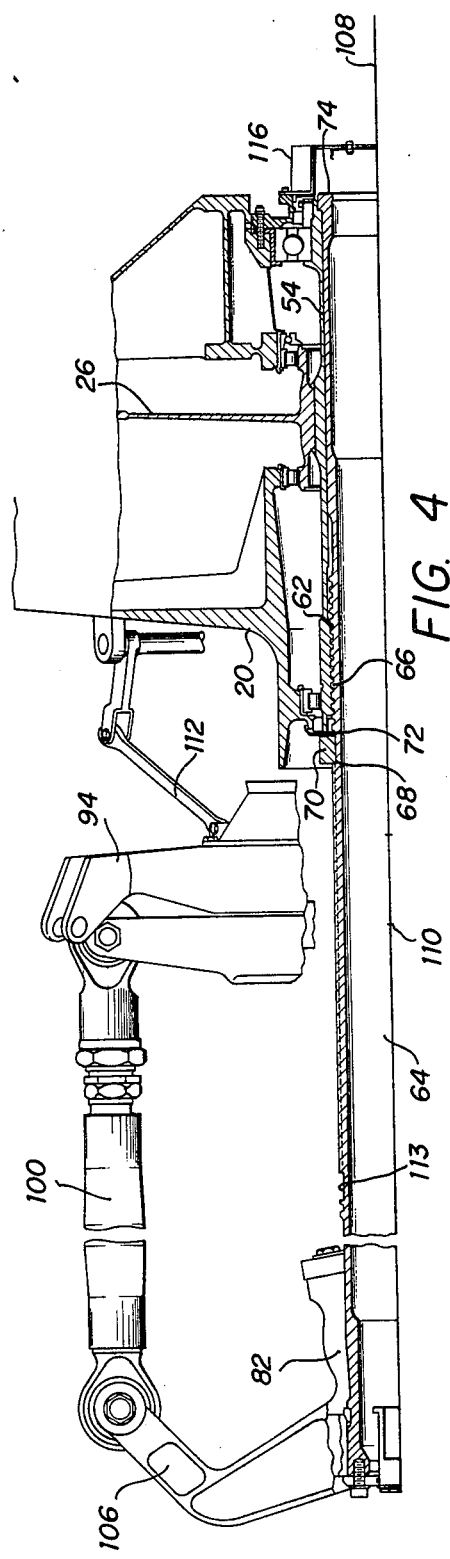
Figure 5:
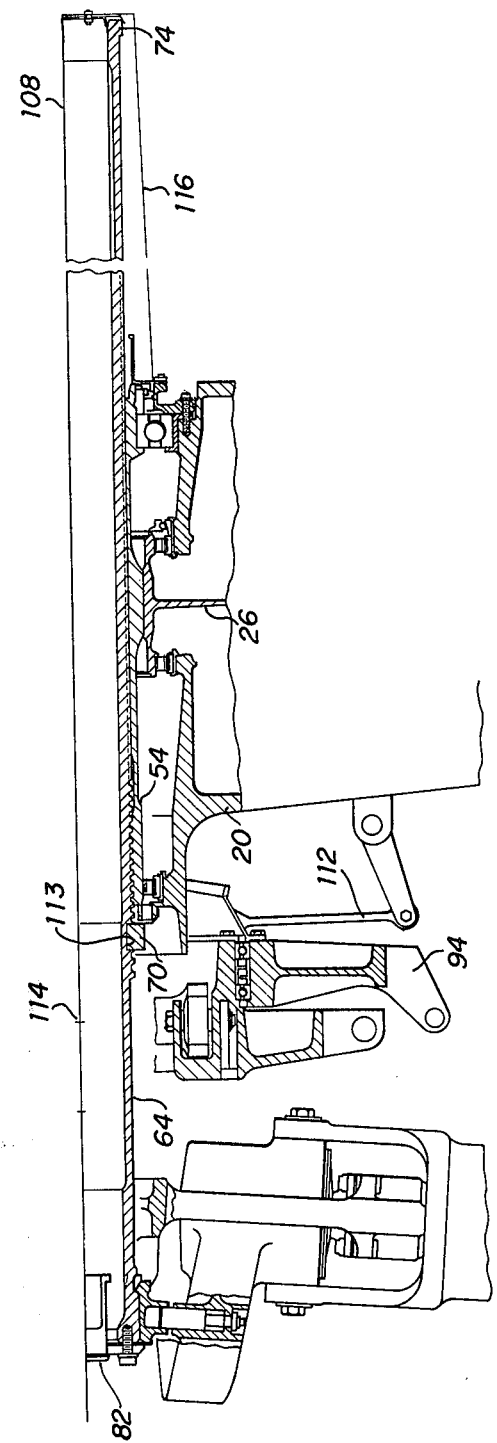

FIG. 4. is a half section view showing the main rotor mast in an extended and operating position;

FIG. 5 is a half section showing the main rotor mast in a retracted or stowed position;

FIG. 6 is a schematic showing the relationship of the gear box and the main rotor with the helical spline shaft in the extended and operating position;

FIG. 7 is a schematic showing the relationship of the gear box and the main rotor with the helical spline mast in the retracted or stowed position;

FIG. 8A is a section of the lower portion of the gear box showing a boot for enclosing the lower end of the gear box and expandable to accommodate the retracting main rotor mast shown in the extended and operating position;

FIG. 8B is a fragmentary view of the boot of FIG. 8A showing the engagement of the main rotor mast in the retracting position with the lower end of the enclosing boot engaging a clip mechanism; and FIG. 8C is an enlarged view of the clip mechanism of FIG. 8B.

Figure 1:
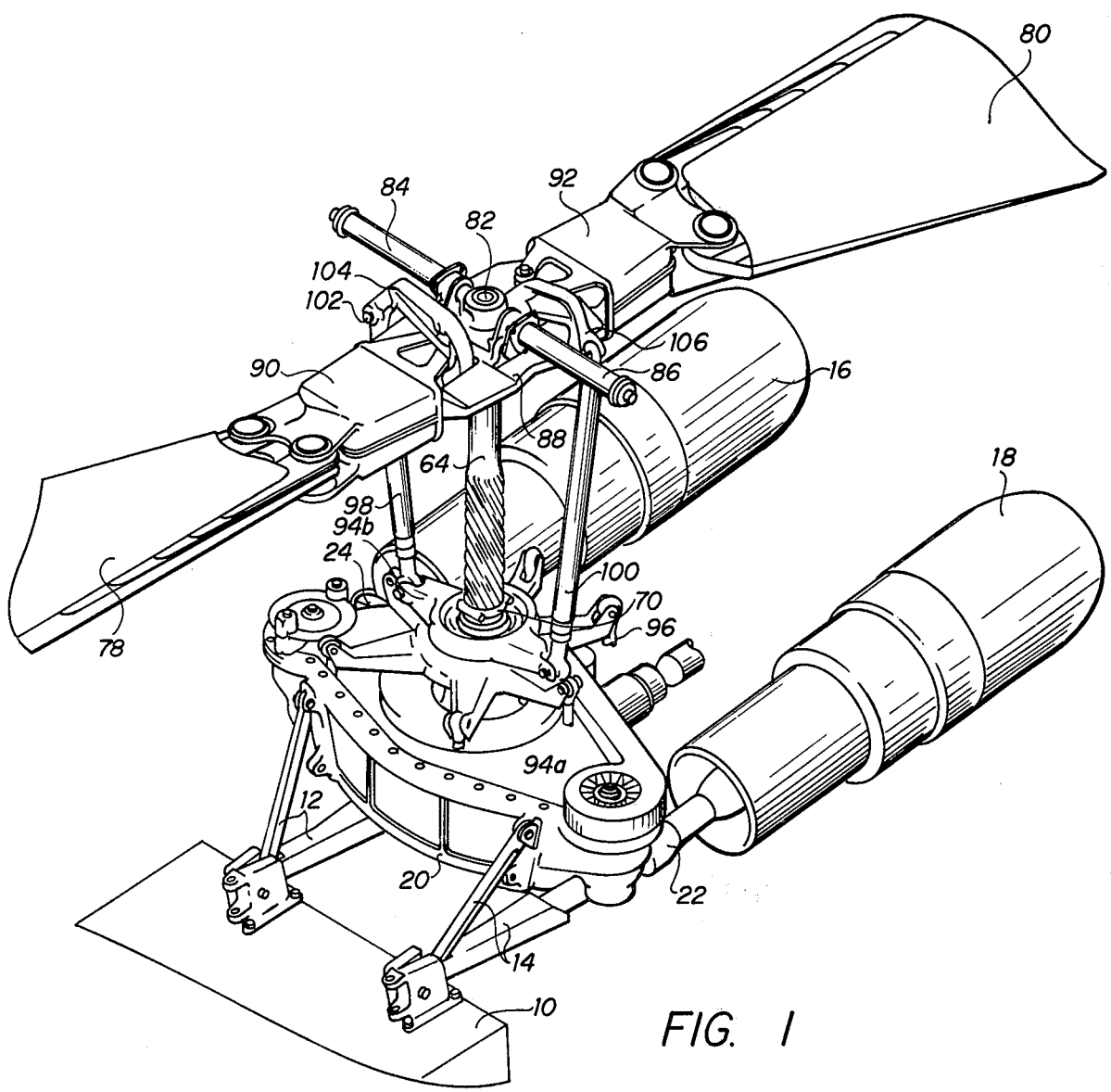
FIG. 1 is a pictorial view of the gear box of a helicopter for coupling the power output of two engines to a two bladed main rotor through a helical spline mast.

Referring to the drawings, and in particular to FIG. 1 where there is shown the drive train for a two bladed main rotor attached to the fuselage 10 on a helicopter by means of pylon support struts 12 and 14. The power source for the drive train includes engines 16 and 18 coupled independently to a gear case 20 by means of input drive shafts 22 and 24.

Figure 2:
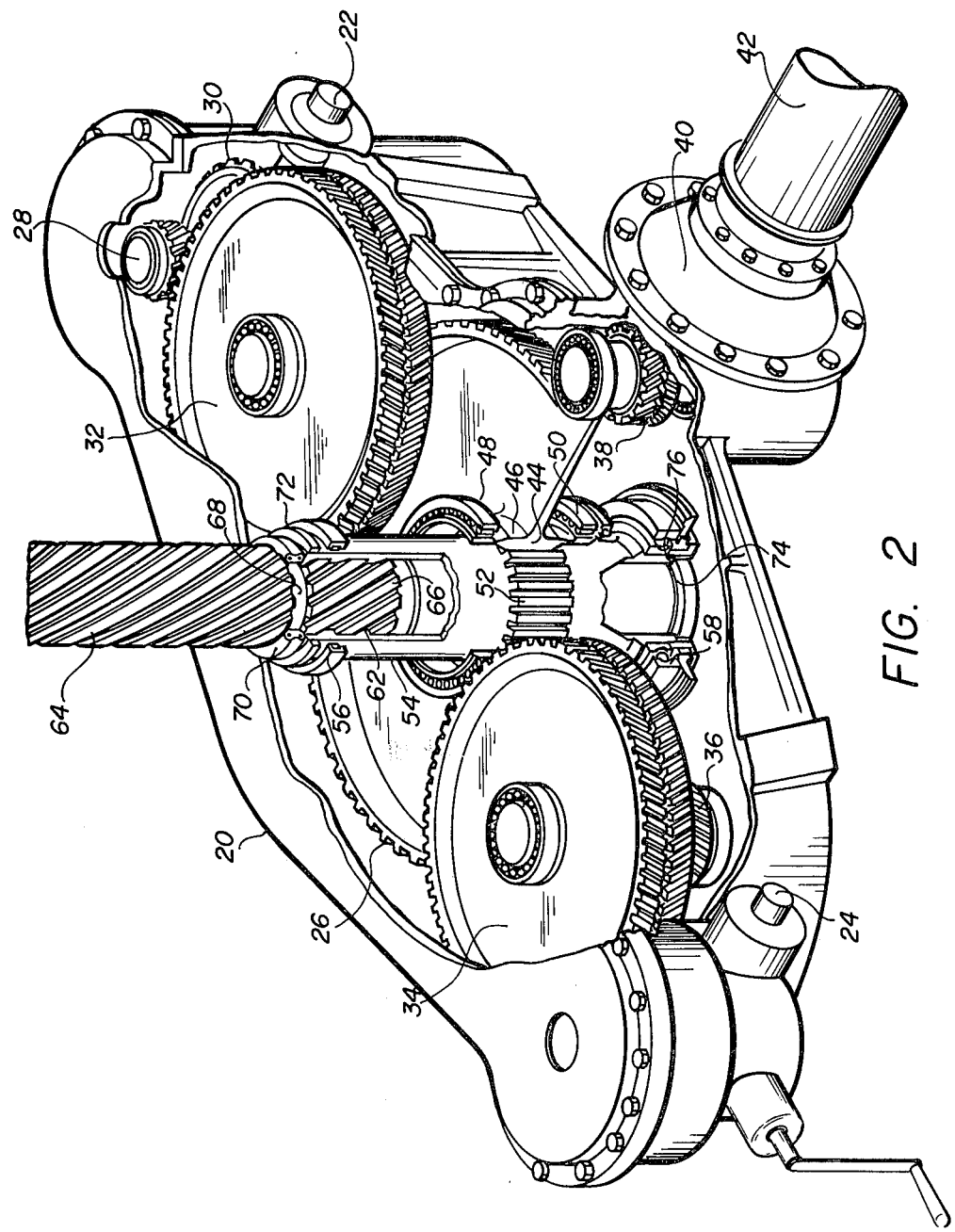
FIG. 2 is a pictorial view, partially cutaway, of the helicopter gear box showing a mast adapter shaft engaging the helical spline of the main rotor mast.

Referring to FIG. 2, the gear case 20 includes gearing for coupling to the input drive shafts 22 and 24 to a single herringbone collector gear 26. The drive train from the collector gear 26 back to and including the engines 16 and 18 is redundant with two separate gear trains independently operable. From the input drive shaft 22 to the collector gear 26 the gear train comprises a herringbone pinion 28 coupled to the input drive shaft through a gear 30 and engaging a herringbone cluster gear 32. The cluster gear 32 includes a herringbone pinion (not shown) engaging the collector gear 26. From the input drive shaft 24 a herringbone pinion (not shown) drives a herringbone cluster gear 34 having a pinion 36 engaging the collector gear 26.

Also driven by the engines 16 and 18 through the collector gear 26 is a pinion 38 as part of a gear and pinion (not shown) in the gear box 40 driving a tail rotor drive shaft 42.

Figure 3:
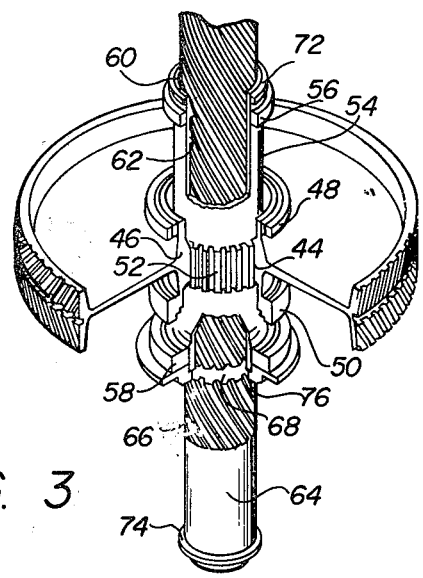
FIG. 3 is an enlarged view of the mast adapter shaft and the helical spline of the main rotor mast.

Referring to FIG. 2 and 3, the collector gear 26 includes an internal spline 44 in a hub section 46. To support the collector gear 26 in the gear case 20, bearings 48 and 50 are press fit onto the hub section 46.

Engaging the internal spline of the hub section 46 is an external spline section 52 of a mast adapter 54. The mast adapter 54 comprises a main cylindrical section rotatable in the gear case 20 by means of bearings 56 and 58. Also provided on the main cylindrical section of the mast adapter 54 is an oil seal 60.

Formed internally within the main section of the mast adapter 54 is a helical spline 62. This helical spline is an integral part of the uppper portion of the main cylindrical section and engages an external helical spline 66 forming an integral part of the main rotor mast 64.

Encircling the main rotor mast 64 toward the lower end of the helical spliine 66 is a clamp groove 68 into which is assembled a split-ring holding clamp 70. With the main rotor mast 64 in the fully extended position, the split-ring clamp 70 is assembled in the clamp groove 68 and is in contact with the upper shoulder 72 of the adapter 54 and acts as a down-stop to prevent the mast from retracting unintentionally. Also provided on the main rotor mast 64 is an up-stop shoulder 74 that engages the lower surface 76 of the adapter 54. AS the mast 64 is extended, the up-stop shoulder 74 engages the surface 76 to limit the upward travel.

Referring again to FIG. 1, the drive train to the main rotor blades 78 and 80 includes a trunnion 82 attached to the top of the main rotor mast 64. Bolted to the trunnion 82 are concentric tube spring restraints 84 and 86 that couple the trunnion to a yoke 88. Rotatably attached to the yoke 88 are blade grips 90 and 92 supporting the rotor blades 78 and 80, respectively. A more complete description of the coupling between the main rotor mast 64 and the rotor blades 78 and 80 will be found in the copending application of Glen E. Johnson, entitled CONCENTRIC TUBE SPRING ROTOR MOUNT, Ser. No. 295,885, and assigned to the assignee of the present invention.

In accordance with conventional practice, the pitch of the rotor blades 78 and 80 is varied by positioning a collective and cyclic pitch control swash plate 94. The swash plate 94 includes a stationary hub 94a and a rotating collar 94b. Attached to the stationary hub 94a are control links 96 and attached to the rotating collar 94b are pitch links 98 and 100. The pitch link 98 is coupled at an upper end clevis by a quick release disconnect 102 to a pitch arm 104. The pitch arm 104 is a part of the blade grip 90. The pitch link 100 is coupled at an upper end clevis by a quick release disconnect (not shown) to a pitch arm 106 that is a part of the blade grip 92.

Referring to FIG. 4, there is shown a half section of the mast 64 in an extended and operating position with the split-ring clamp 70 in place against the shoulder 72 of the mast adapter 54 to hold the mast in the extended position. The helical spline 62 of the mast adapter 54 is in engagement with the helical spline 66 of the mast and when in the operating position couples driving power from the collector gear 26 to the rotor blades 78 and 80. The cut of the helix is in the direction so that with the mast 64 in an extended position, the lower portion, terminating at the shoulder 74, is in engagement with the internal diameter limit the mast adapter 54 to maintain the mast vertically aligned to rotate about an axis 108. The upstop shoulder 74 is now in contact with the surface 76 to limiit the upward travel of the mast 64.

With the mast 64 in an extended position, pitch links 98 and 100 are coupled to respective pitch arms 104 and 106 to control blade pitch through the swash plate 94. In the operating position the swash plate 94 is located along the mast 64 by a reference mark 110 and is connected to pilot controls through control links 112.

When operating with the mast 64 extended, power from the engines 16 and 18 is transmitted through the cluster gears 32 and 34, respectively, to the collector gear 26. Rotation of a collector gear 26 is imparted to the mast adapter 54 and through the helical spline of the mast 64 to the trunnion 82 for rotating the rotor blades 78 and 80 and the system functions in a normal helicoptor mode.

To retract the mast into a stowed position, the split-ring clamp 70 is removed from the clamp groove 68 and reassembled into the clamp groove 113. The clamp groove 113 is located toward the upper end of the mast 64 immediately below the trunnion 82. When in the clamp groove 113, the split-ring clamp 70 acts as a downstop when engaging the surface 72 to limit the downward travel of the mast through the mast adapter 54.

Next, the pitch links 98 and 100 are disconnected by means of the quick disconnect pins. The swash plate 94 and the control links 112 are lowered into a fold-down position as indicated by the reference mark 114. A rotor positioning tube (not shown) is installed to hold the rotor yoke 88 and the mast 64 stationary with respect to the gear case 20. The collector gear 26 is rotated by revolving the entire gear train by a removable auxiliary source (such as shown in FIG. 2) with either a hand crank, an electric drive or a hydraulic motor. The spline of the mast adapter 54 in engagement with the spline of the main rotor mast 64, now held stationary, lowers the mast to the position shown in FIG. 5. The mast 64 is lowered until the split-ring clamp 70 is in contact with the shoulder 72. The yoke 88 and the complete main rotor assembly are now positioned immediately above the swash plate 94.

Referring to FIGS. 6 and 7, there is shown schematically the relative position of the main rotor with respect to the gear case 20 with the mast 64 in the extended position and the relationship of the main rotor with respect to the gear case 20 with the mast 64 in the fully retracted position. When retracted, the main rotor blades remain in the extended position; however, these blades may be equipped with the power folding mechanism of U.S. Pat. No. 3,749,515 to permit folding of the rotor blade over the aircraft fuselage or may be manually folded.

With the main rotor mast 64 in the fully extended position as shown in FIG. 6, a collapsible boot 116 encloses the lower end of the gear case 20 at the lower end of the mast. As the mast is retracted to the position shown in FIG. 7, the collapsible boot 116 expands through movement of the mast to a position as shown.

Referring to FIGS. 8A and 8B, there is shown the collapsible boot 116 attached to the lower end of the gear case 20 by means of a support ring 118 and fasteners 120. The lower end of the boot 116 is enclosed by a plate 122 bolted or otherwise secured to holding clips 124 and 126. With the boot 116 in the collapsed position as shown in FIG. 8A, the holding clip 126 engages a shoulder 127 on a latch 128 secured to the gear case 20 by means of the support ring 118. The boot 116 is held in the collapsed position by the latch 128.

As the main rotor mast 64 is retracted from an extended position, an annular groove 130 engages the clip 124 and the lower surface of the mast contacts the plate 122. The collapsible boot 116 unfolds as shown in FIGS. 5 and 8B to maintain a sealed conditition at the lower end of the gear case 20. The force of the mast acting on the plate 122 unlatches the clip 126 from the latch 128 thus allowing the boot to unfold.

The clips 124 and 126 are designed as shown in FIG. 8C so that angle α is greater than angle B allowing a low engagement force and a higher disengagement force. Then on retracting clip 124 engages before the clip 126 disengages and on extension the clip 126 engages before the clip 124 disengages.

When the mast is extending, the holding clip 124 remains engaged in the groove 130 thereby causing the plate 122 to be lifted upward along with the mast. This causes the boot 116 to be folded as shown in FIG. 8A. When the boot is collapsed into the position of FIG. 8A, the holding clip 126 again engages the shoulder of the latch 128 thereby restricting further folding of the boot 116. The mast continues to be extended by action of the mast adapter 54 and the holding clip 124 becomes disengaged from the annular groove 130. The collapsible boot 116 is then held in place by means of the clip 126. Thus, the collapsible boot is extended and folded by action of the mast 64.

While only one embodiment of the invention, together with modifications thereof, has been described in detail herein and shown in the accompanying drawings, it will be evident that various further modifications are possible without departing from the scope of the invention.

What is claimed is:

1. In a helicopter drive train having a mast supporting a rotor for rotation thereof and temporarily anchored against rotation, the combination comprising:

an externally threaded section extending along the length of said mast as a part thereof;

an internally threaded sleeve encircling said mast and engaging the externally threaded section;

drive means coupling a power source to said sleeve for imparting rotation thereto to extend and retract said mast through the sleeve;

a housing enclosing said drive means and threaded sleeve and having axially aligned openings for passage of said mast when extending and retracting; and sealing means attached to one opening of said housing and expandable to accommodate the mast retraction.

2. In a helicopter drive train as set forth in claim 1 wherein said sealing means includes an expandable boot having an open end fastened to said housing and a closed end movable from a collapsed position with the retraction of said mast.

3. In a helicopter drive train as set forth in claim 7 including clip means as part of said boot for engaging a latch attached to said housing to hold the boot in a collapsed position.

4. In a helicopter drive train as set forth in claim 3 including a second clip engaged by said mast when retracted from an extended position.

5. In a helicopter drive train as set forth in claim 1 including an extension stop on the lower end of said mast for limiting the extension travel thereof.

6. In a helicopter drive train as set forth in claim 5 including a retraction stop in contact engaging said mast for limiting the retraction travel thereof.

7. In a helicopter drive train having a mast supporting a rotor for rotation thereof and temporarily anchored against rotation, the combination comprising:

an external helical threaded section extending along the length of said mast as a part thereof;

an internal helical threaded sleeve encircling said mast and engaging the external helical threaded section;

drive means including a collector gear having a center bore with said threaded sleeve extending therethrough and in driving engagement therewith for imparting rotation thereto to extend and retract said mast through the sleeve;

a housing enclosing said drive means and threaded sleeve and having axially aligned openings for passage of said mast when extending and retracting; and sealing means attached to one opening of said housing and expandable to accommodate the mast retraction.

8. In a helicopter drive train as set forth in claim 7 including an extension stop on the lower end of said mast for limiting the extended travel thereof.

9. In a helicopter drive train as set forth in claim 8 including a retraction stop engaging said mast for limiting the retraction travel.

10. In a helicopter drive train as set forth in claim 7 wherein said sealing means includes an expandable boot having an open end fastened to said housing and a closed end movable from a collapsed position with a retraction of said mast, said boot including a clip means on the closed end thereof to be engaged by said mast when retracted from an extended position and for engaging a latch attached to said housing to hold the boot in a collapsed position with the mast in an extended position.

11. In a helicopter having a main rotor assembly extending above a fuselage between a first position and a second position, the combination comprising:

a. a main rotor assembly on a mast having an external threaded section extending along the length of said mast, b. means including an internally threaded sleeve encircling said mast and engaging the externally threaded section thereof to support the main rotor assembly above the fuselage in a first position and in a second position, c. means to extend and retract the main rotor assembly between the two positions thereof, and d. means to drive the main rotor in at least one of the two positions.

12. In a helicopter having a main rotor assembly as set forth in claim 11 wherein said means to extend and retract the main rotor includes a collector gear having a center bore with said threaded sleeve extending therethrough and in driving engagement therewith for imparting rotation thereto to extend and retract said mast through the sleeve.

13. In a helicopter having a main rotor assembly as set forth in claim 12 including an extension stop on the supporting mast for limiting the extended travel thereof.

14. In a helicopter having a main rotor assembly as set forth in claim 13 including a retraction stop engaging the supporting mast for limiting the retracted travel thereof.

* * * * *

UNITED STATES PATENT OFFICE
CERTIFICATE OF CORRECTION

Patent No. 3,912,199    Dated Oct. 14, 1975

Inventor(s) Charles M. Seibel and Joseph A. Canavespe

It is certified that error appears in the above-identified patent and that said Letters Patent are hereby corrected as shown below:

Col. 2, line 60, "spliine" should be --spline--.
Col. 3, line 41, "limit" should be --of--.
Col. 5, line 36, "Claim 7" should be --Claim 2--.

Signed and Sealed this twenty-seventh Day of January 1976

[SEAL]

Attest:

RUTH C. MASON
Attesting Officer

C. MARSHALL DANN
Commissioner of Patents and Trademarks